US011208295B2

(12) United States Patent
Siikonen et al.

(10) Patent No.: US 11,208,295 B2
(45) Date of Patent: Dec. 28, 2021

(54) PASSENGER COUNTING ARRANGEMENT (71) Applicant: KONE Corporation, Helsinki (FI)

(72) Inventors: Marja-Liisa Siikonen, Helsinki (FI); Johan Backlund, Helsinki (FI); Janne Sorsa, Helsinki (FI); Juha-Matti Kuusinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 372 days.

(21) Appl. No.: 16/250,757

(22) Filed: Jan. 17, 2019

(65) Prior Publication Data
US 2019/0152740 A1 May 23, 2019

Related U.S. Application Data (63) Continuation of application No. PCT/FI2016/050641, filed on Sep. 15, 2016.

(51) Int. Cl.
B66B 1/34 (2006.01)
G01G 19/42 (2006.01)
G01V 8/10 (2006.01)
G06M 1/10 (2006.01)

(52) U.S. Cl.
CPC .......... B66B 1/3476 (2013.01); G01G 19/42 (2013.01); G01V 8/10 (2013.01); G06M 1/101 (2013.01)

(58) Field of Classification Search
CPC .... B66B 1/3476; B66B 1/3484; G01G 19/42; G01V 8/10; G06M 1/101
See application file for complete search history.

(56) References Cited

U.S. PATENT DOCUMENTS

2012/0138388 A1 6/2012 Finschi et al.
2012/0279807 A1* 11/2012 Finschi ................. B66B 1/2466
187/384

OTHER PUBLICATIONS

Backlund, Johan "Automatic Detection of Elevator Passengers, Master's Thesis", Aalto University, School of Electrical Engineering, published Dec. 16, 2015, pp. 29-38, 49.
International Search Report, issued in PCT/FI2016/050641, PCT/ISA/210, dated Jan. 11, 2017.
Written Opinion of the International Searching Authority, issued in PCT/FI2016/050641, PCT/ISA/237, dated Jan. 11, 2017.

* cited by examiner

Primary Examiner — Manuel L Barbee
(74) Attorney, Agent, or Firm — Birch, Stewart, Kolasch & Birch, LLP (57) ABSTRACT An arrangement of counting passengers in an elevator using two separate counting mechanisms is disclosed. The elevator car typically has a curtain of light arranged to the door and a load weighing device arranged to measure the weight of the elevator car. From the information recorded by the curtain of light and the load weighing device, it is possible to count the number of passengers. The reliability of the counting results can be improved by processing the counting results for forming a combined counting result that provides a more reliable counting result when the independent counts deviate from each other.

20 Claims, 6 Drawing Sheets

PASSENGER COUNTING ARRANGEMENT

CROSS REFERENCE TO RELATED APPLICATIONS

This application is a Continuation of PCT International Application No. PCT/FI2016/050641 filed on Sep. 15, 2016, which is hereby expressly incorporated by reference into the present application.

DESCRIPTION OF BACKGROUND

A passenger counting arrangement is disclosed. The disclosed passenger counting arrangement relates to the field of elevator technology and in particular to an arrangement for counting the number of passengers during elevator rides.

Passenger tracking and identification is used in various applications in modern elevator arrangements. Particularly in big buildings having a plurality of elevators possibly in several elevator groups the passenger flows are measured in order to optimize the use of the elevators. This will provide significant savings, as when the elevators are used efficiently, less elevators or smaller elevators are needed and the space required by the elevators can be used for other purposes. Another example of the use of passenger information may relate to security reasons. For example, in case of fire it is beneficial to know how many persons are in the building and on which floors they are located.

Tracking equipment may be configured to count persons. More advanced versions may be configured to recognize persons in the building. A simple solution is to use access gates which a person physically touches when he or she passes by. However, these are not suitable for calculating persons making inter-floor trips, and are usually provided in lobbies and other places where it may also be checked if the person has a permission to enter the building. In another example a machine vision system may be used to count and identify persons; however, this solution may cause problems with privacy-related matters. Furthermore, the machine vision system needs to be installed as an additional piece of equipment to each elevator car monitored. This causes additional expenses and increases the components in an elevator car, which will increase maintenance expenses.

Each modern elevator car typically comprises a two-dimensional curtain of light arranged to the doors. The curtain of light is arranged into the doorway of an elevator and it can count each person entering or exiting an elevator. Another device that may be used for counting is the weighing device of the elevator car. When the weight changes a person enters or exits the elevator car.

Simple methods with a curtain of light or weighing device provide reasonably good results with smaller passenger flows; however, when several persons may enter and exit an elevator car at the same time it is difficult to detect how many actually went in and how many came out. The problem is even more difficult to solve because people have different sizes and weights and may have heavy items with them.

Thus, there is always a need for providing better methods for counting passenger flows with existing equipment.

SUMMARY

A passenger counting arrangement is disclosed. The arrangement for counting passengers in an elevator uses two separate counting mechanisms. An elevator car typically has a curtain of light arranged to the door and a load weighing device arranged to measure the weight of the elevator car. From the information recorded by the curtain of light and the load weighing device it is possible to count the number of passengers. The reliability of the counting results can be improved by processing the counting results for forming a combined counting result that provides a more reliable counting result when the independent counts deviate from each other. In an embodiment method for counting the number of passengers in an elevator car is disclosed. The method comprises detecting a first number of passengers using a load weighing device of the elevator and detecting a second number of passengers using a curtain of light. The method further comprises comparing the first number and the second number. As a response to an equal value of the first and the second number the value is approved as the number of passengers. As a response to unequal values a compensation value is determined for one of the first and second numbers by using information received from a corresponding measurement device. The compensation value may be determined for smaller or larger value and may be negative. The compensation value is added to one of the values and the result of the addition is provided as a passenger count. For example, it may be determined that the compensation value is always determined for the smaller value. In an embodiment the compensation value is zero or one. In another embodiment the compensation does not exceed the difference between the first and the second number. In a further embodiment, when the first number is smaller, the compensation value is determined by dividing the weight measured by the measurement device by the weight of an average person and determining the compensation for the first number based on the division result. In another embodiment when the second number is smaller, the compensation value is determined by detecting legs from the measurement of the curtain of light and detecting if persons detected by the curtain of light comprise more than two legs, and adding passengers to the compensation value based on the detection. In a further embodiment when the compensation value determined is less than the difference between the first number and the second number, the method further comprises determining a further compensation value by combining the measurements and determining if the combined weight of a detected pair of persons is smaller than an average weight of two persons. In a further embodiment method further comprises using the order of received measurement results for determining the compensation value. In another embodiment in addition to using the order using a time interval between the measurement results for determining the compensating value.

In an embodiment a computer program is disclosed. The computer program is configured to perform the method described above when executed in a computing device.

In an embodiment an apparatus is disclosed. The apparatus comprises at least one processor configured to execute computer programs, at least one memory configured to store computer programs and related data and a data communication connection configured to receive data from a curtain of light and a load weighing device of an elevator car (400). The apparatus is further configured to perform a method described above. In another embodiment an elevator comprising the apparatus disclosed above is disclosed.

The passenger counting arrangement described above is easy to implement in many elevators as they already have a load weighing device and a curtain of light for counting persons. The arrangement described above provides better counting results using the tools mentioned above. A further benefit of the disclosed arrangement is improved functionality of many other applications that use passenger counts as input information because of the more reliable input information.

BRIEF DESCRIPTION OF THE DRAWINGS

The accompanying drawings, which are included to provide a further understanding of the passenger counting arrangement and constitute a part of this specification, illustrate embodiments and together with the description help to explain the principles of the passenger counting arrangement. In the drawings.

DETAILED DESCRIPTION

Reference will now be made in detail to the embodiments, examples of which are illustrated in the accompanying drawings.

In the following a method and an arrangement for implementing the method will be described. In the method a load weighing device and a curtain of light are used. In the description the load weighing device refers to any load weighing device that is capable of measuring the weight of an elevator car when the elevator car is in use. A load weighing device is a common component and almost every elevator has one.

In the description the curtain of light refers to a curtain of light installed in the doorway of an elevator car. The curtain of light observes different heights of persons and locations of body parts when passengers are passing by. The curtain of light stores measurement results for a given time interval, and the stored results can then be analyzed and the number of persons passing by calculated.

In the arrangement described below, measurement results from both the load weighing device and the curtain of light are received at a controlling device. If the measurement results do not indicate the same number of passengers, one of the two measurement results must be adjusted. If the adjustment does not provide equal results, one of the results must be chosen as a representative value, or a representative value may be computed based on original or adjusted measurements.

Thus, in the following a method and arrangement are disclosed for combining two different results received from two different measurement devices, respectively. The combination is accepted as such if both indicate the same result; however, in case of different results, the combination is produced by computing.

Figure 1A:
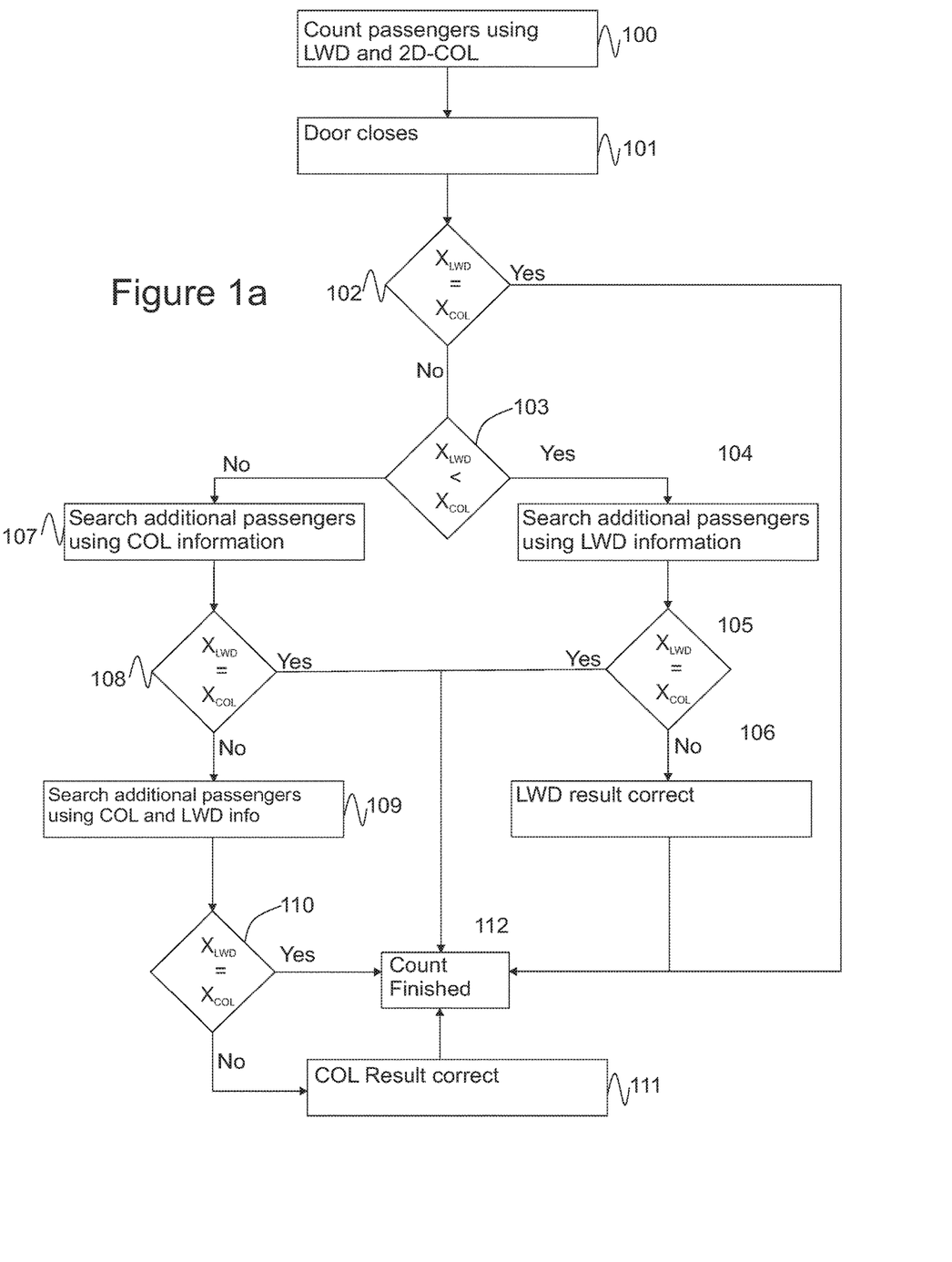
FIG. 1a is a flow chart of an example method according to the present passenger counting arrangement.

In FIG. 1, a method according to the above principle is disclosed. The method is only an example and it can be modified within the principles mentioned above.

First, the passengers entering and leaving an elevator car are counted, step 100. The counting is done independently by a load weighing device and a curtain of light. The counting may be done in a controller device that continuously receives data from the load weighing device and the curtain of light. Thus, for example, when a person enters an elevator car the load weighing device shows a change of weight. This is recorded by the controlling device so that it can be seen, for example, how much the weight changed and when it happened. Correspondingly, similar information is received from the curtain of light. The counting is stopped when the door closes, step 101.

In FIG. 1, the first step of the actual method is to determine if $X_{LWD}$ and $X_{COL}$, which represent the counting results from the load weighing device and the curtain of light, respectively, are equal. If they are equal, no further processing is needed and the method proceeds to the last stage, step 112.

If $X_{LWD}$ and $X_{COL}$ are not equal, the method proceeds to step 103, where it is determined which one is greater. If $X_{LWD}$ is less than $X_{COL}$, the answer to the comparison of step 103 is "Yes" and the method proceeds to step 104. In step 104, additional passengers are searched based on information received from the load weighing device.

In step 104, additional passengers are searched from information received from the load weighing device. A simple algorithm to acquire the weight of the passengers is to divide the measured weight by an average weight of a passenger. The average weight may be adjusted according to the geographical area, as the weights are different in different areas.

The search may be done by searching if one more person could be found and, if found, then one more person is added to the count. In another option it is possible to try to find more than one person. In such option it is possible to make other limits than one, for example two, or the limit may be the difference between $X_{LWD}$ and $X_{COL}$, so that $X_{COL}$ cannot be more than $X_{LWD}$. The selection of how many persons can be found may be set on the basis of the application. Thus, when the elevator is small in size, it can be assumed that not more than one person enters the elevator at same time, while in big elevator cars it is possible that more than one enter and exit at the same time. Thus, the range for compensation needed may be larger.

After the search and the possible addition has been done, it is again determined if $X_{LWD}$ and $X_{COL}$ are equal, step 105. If they are equal, the count is finished, step 112. If $X_{LWD}$ and $X_{COL}$ are still not equal, the value of $X_{LWD}$ is assumed to be the correct one and the count is finished, step 112. It is possible to use the compensated value or the actual value measured by the load weighing device.

If the answer to the comparison in step 103 is "No", which means that the curtain of light has provided a smaller number of passengers, additional passengers are searched from curtain of light data, step 107. This can be arranged, for example, by searching the number of legs found in the curtain of light data. Based on the number of legs, or other body parts, it can be estimated how many passengers entered and left the elevator car. As discussed above, it is possible to search only one additional passenger or more passengers; however, the limit may be set so that the adjusted $X_{COL}$ does not exceed $X_{LWD}$. Corresponding to step 105, after the search and the possible addition has been done, it is again determined if $X_{LWD}$ and $X_{COL}$ are equal, step 108. If they are equal, the count is finished, step 112.

The combination can be done, for example, by searching persons that are close to each other when entering the elevator car. Persons may be considered to be close to each other, for example, when the difference is less than 500 ms.

If they are still not the same, a further search based on combining the curtain of light and weight information is done, step 109. If the combined weight of two persons is smaller than that of two average persons, then these two persons detected by the curtain of light may be combined as one person.

The combination is done based on a predetermined time interval used for analysis. The result received from the curtain of light precedes the load weighing device result when a person is entering the elevator car and vice versa. Thus, it is possible to detect if the person is entering or leaving the elevator car based on the order of the measurement results. This improves the reliability of the count as it is not possible to detect walking direction solely based on the results from the curtain of light. The time interval may be chosen according to the installation. The delay between detecting a person at curtain of light and load weighing device varies according to the direction.

Figure 1B:
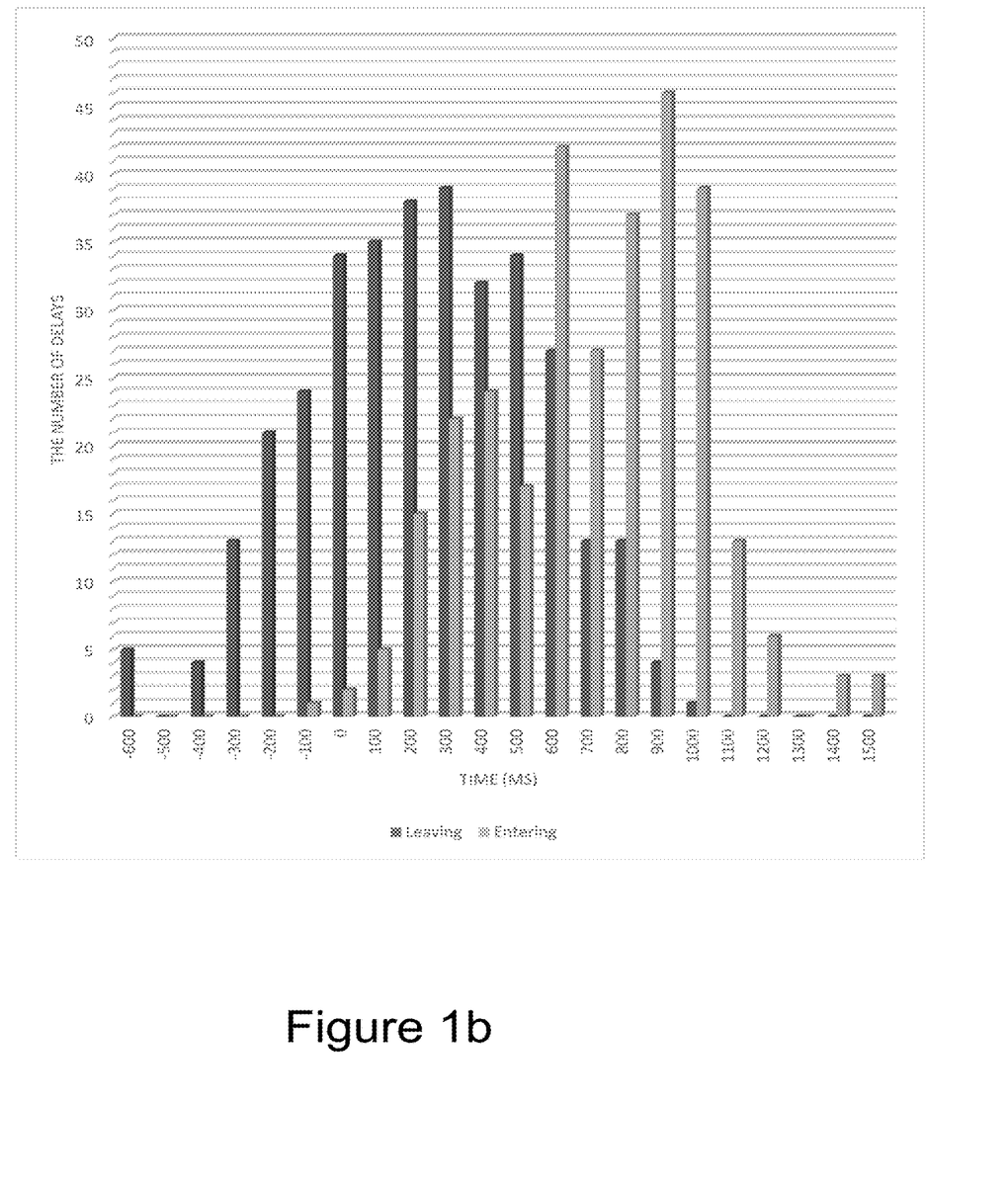
FIG. 1b is a diagram illustrating delays between measurements.

FIG. 1b discloses some examples of measurements. An average delay between the measurements for people entering the elevator is 700 ms and leaving the elevator is 300 ms. These time differences may be used in further analysis of the measurements particularly when there is a plurality of people entering and leaving the elevator. In this example the analysis time interval could be set, for example to 1-1.5 seconds.

It is possible that the signal of the load weighing device is analyzed only after the load weighing device has been stabilized. Correspondingly the measurements from the curtain of light may be analyzed after there is nothing in between the curtain of light. This may cause additional delays particularly when a plurality of persons are entering and leaving the elevator.

The comparison of the result after compensation is made again in step 110, and if $X_{LWD}$ and $X_{COL}$ are still not equal, the value of $X_{COL}$ is assumed correct and the count is finished, step 112. If they are equal in the comparison of step 110, the count is finished, step 112.

Above, a method wherein a lower measurement is adjusted upwards has been described. However, the method could also be implemented in another way, for example by computing an average value or adjusting a higher value downwards. The method involves the use of two different counting mechanisms and correction of deviation between the two different counting mechanisms.

Figure 2A:
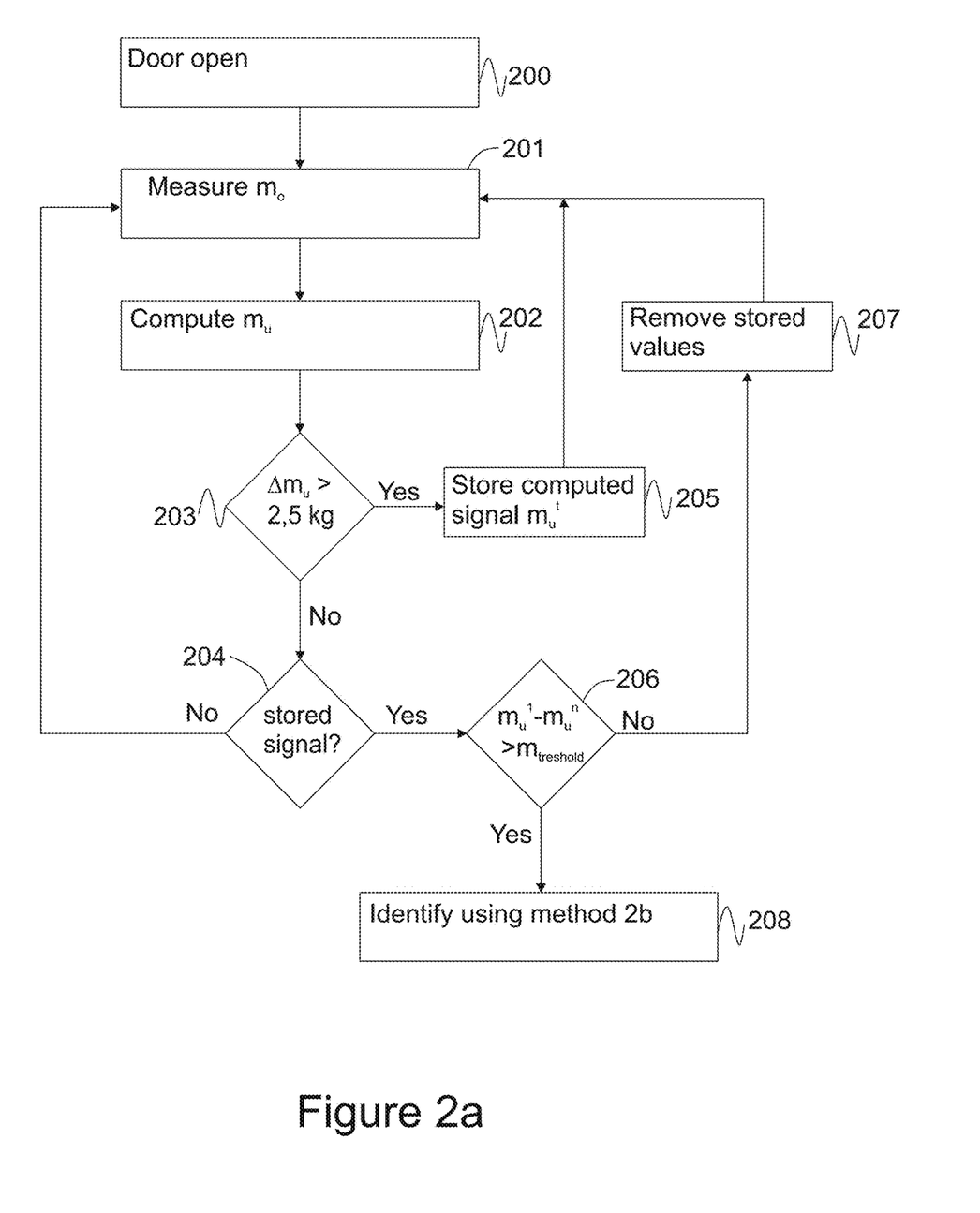
FIG. 2a is a flow chart of an example method according to the present passenger counting arrangement.
Figure 2B:
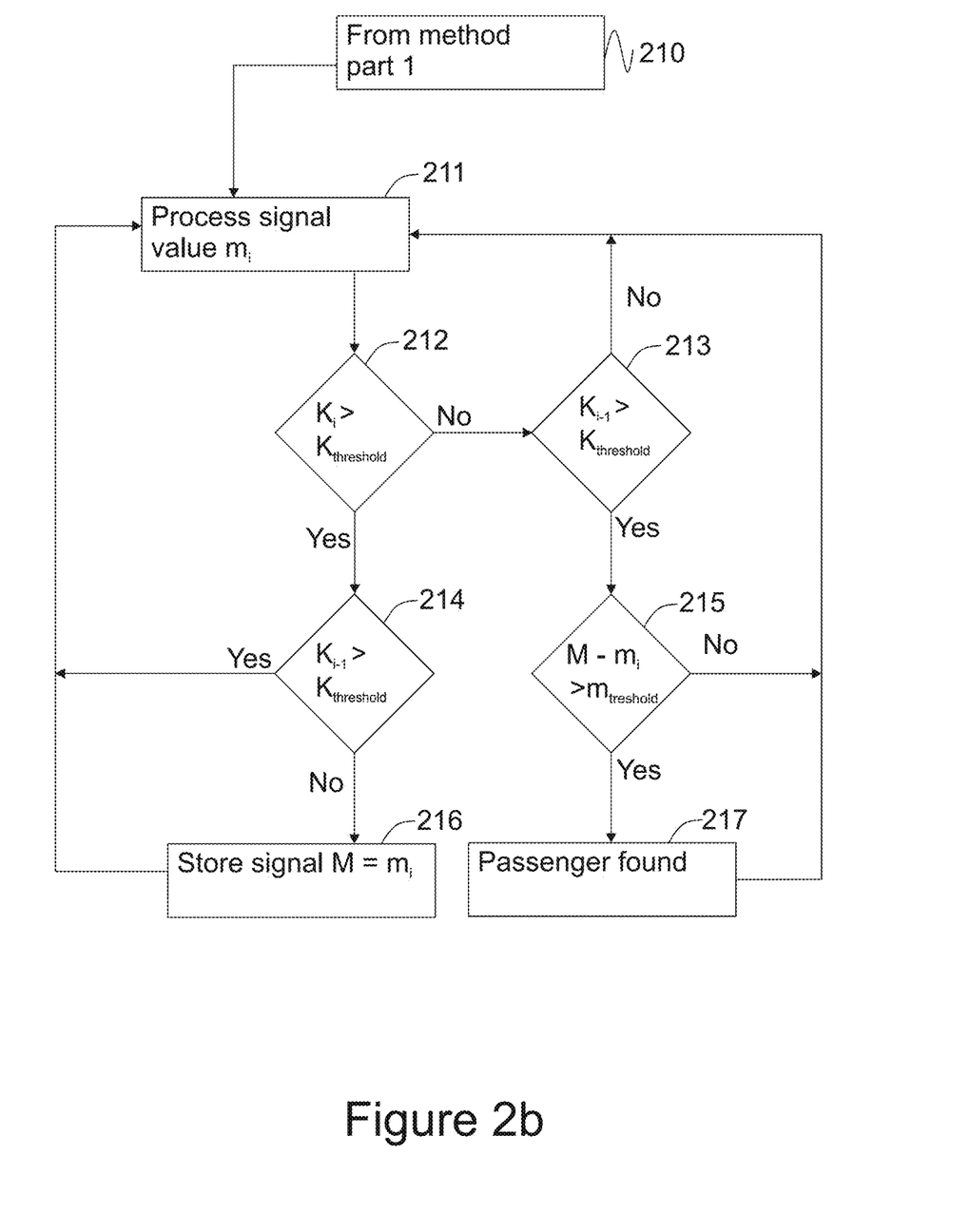
FIG. 2b is a flow chart of an example method according to the present passenger counting arrangement.

In FIGS. 2a and 2b, a method of counting persons using the load weighing device is disclosed. The following is just an example and may be used alone or with the method disclosed in FIG. 1. The method of FIG. 1 does not necessarily require the method according to FIGS. 2a and 2b, but also any other passenger counting method using a load weighing device may be used.

The method starts when the doors are open, step 200, and people can enter and leave the elevator. This is measured with a load weighing device, step 201. The measurement signal $m_u$ may be processed in real time, or processing can be postponed until the doors are closed. The raw measurement signal $m_o$ comprises measurement results over a time period. Thus, from the signal it can be seen how fast and how much the result measured by the weighing device changes.

A processed signal $m_u$ is achieved by using median filtering on the signal, step 202. After computation, it is determined if the change of $m_u$ is over a predetermined limit, for example 2.5 kg, step 203. If the result of the comparison is "Yes", then signal $M_u'$ will be stored, step 205. Then, the method will loop back to step 201 of the measurement or processing of the stored measurement results.

If the answer to the comparison of step 203 is "No", the method proceeds to the next comparison to check if there is a stored signal, step 204. If the answer to the comparison of step 204 is "No", the method loops back to step 201. If the answer is "Yes", the method proceeds to a further comparison in step 206.

Next, a value $M_u^1$-$M_u^n$ is computed and compared against a threshold $m_{threshold}$ value. If the comparison is true and the answer is "Yes", the method of FIG. 2b is initiated, step 208. Otherwise, the stored values are removed, step 207.

After the method of FIG. 2a has been performed and step 208 has been reached, the method continues in step 211. Step 210 only represents the transfer from the method of FIG. 2a and is illustrated for the sake of clarity. The signal processing starts according to the equation below for the median filtered signal that was recorded in the first part illustrated in FIG. 2a.

$$k_i = \frac{\Delta m}{\Delta t} = \frac{m_i - m_{i-1}}{\Delta t}, i = 2, 3, \ldots n,$$

In the equation, n is used to denote the number of recorded values, and $\Delta t$ is computed from a sampling interval h during which the load changes are assumed to occur. This can be computed by using the following equation:

$$\Delta t = h \left[ \frac{\tau}{h} \right]$$

In the method, when $k_i$ exceeds a predefined threshold $k_{threshold}$ for the first time, steps 212 and 214, the corresponding load value $m_i$ is stored to M, step 216. The filtered signal is analyzed until the slope is less than the threshold $k_{threshold}$, which means that the signal has stabilized, step 213.

If the difference between the current value of M and $m_i$ exceeds the threshold $m_{threshold}$, step 215, then at least one passenger has exited or entered the elevator, step 217. The process continues until the whole signal has been processed.

Figure 3:
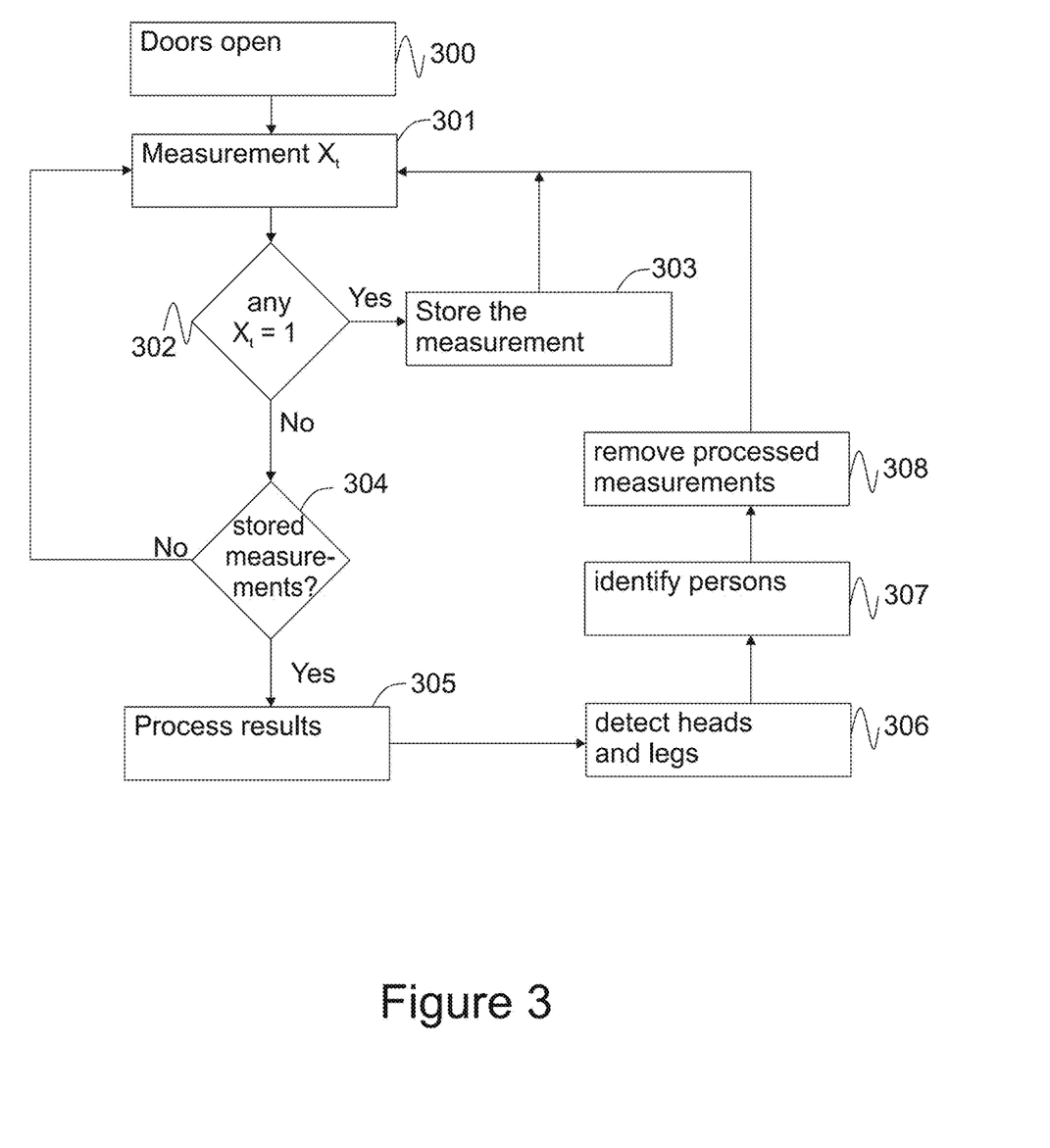
FIG. 3 is a flow chart of an example method according to the present passenger counting arrangement.

In FIG. 3, a curtain of light based algorithm is illustrated. The algorithm begins when the doors are open, step 300. When the doors are open, measurements are recorded or processed in real time according to a predetermined time interval. Each interval or time period is then processed, step 301. After processing, it is first determined if intervals comprising a person are identified, step 302. When a person is found, the respective measurement is stored, step 303. When the measurements have been processed and no new persons are found, it is determined if some results were stored, step 304.

In case of stored results, the method continues by processing the results, for example by filtering, step 305. From the results, heads and legs can be detected by analyzing where the curtain of light was cut and how many segments are visible on predetermined levels, step 306. When a head of a person is detected, then a person is detected, step 307. Lastly, the material already processed is removed.

Figure 4:
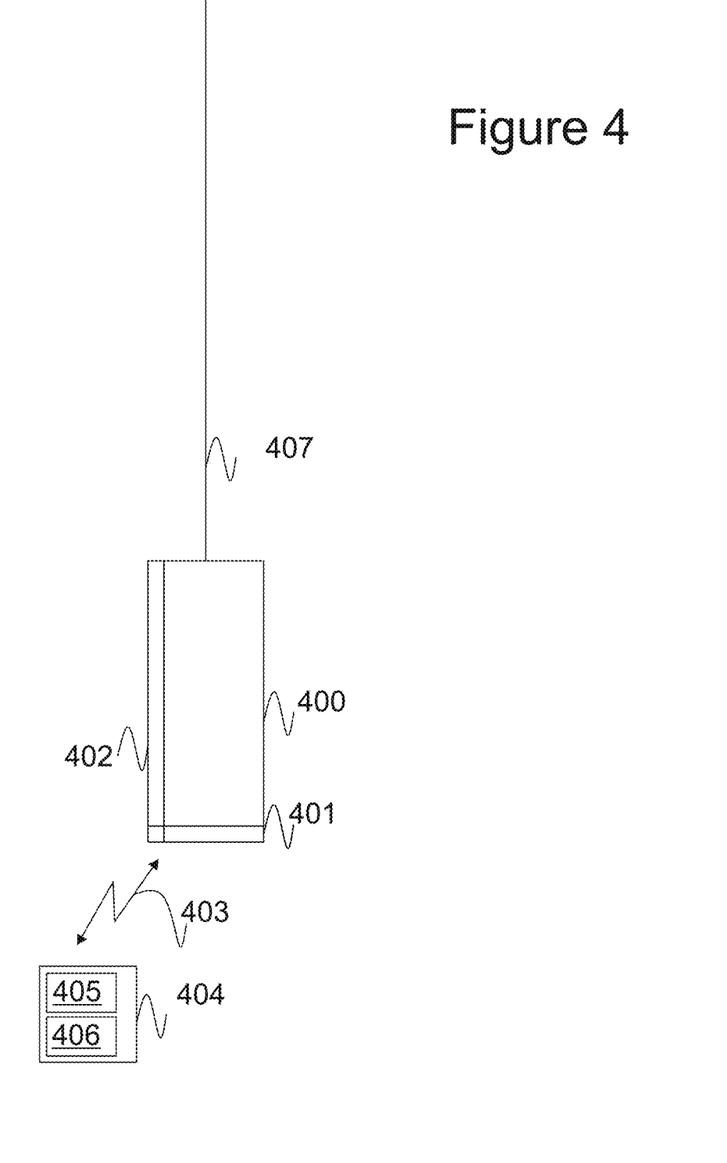
FIG. 4 is a block diagram of an example implementation of a passenger counting arrangement.

FIG. 4 discloses an arrangement using at least one method discussed above. In FIG. 4, an elevator car 400 is disclosed. On the left side of the elevator car 400, a door arrangement including a curtain of light 402 is disclosed. In the elevator car 400, a load weighing device 401 is arranged to the floor of the elevator car 400. Although in FIG. 4 the load weighing device is arranged to the floor, also other types of load weighing devices may be used, provided that they are able to provide an accurate value of the load of the elevator car in a manner that it is possible to calculate the number of persons in the elevator car 400. In FIG. 4, a hoisting rope 407 is shown. The hoisting rope 407 is attached to a support structure comprising a traction sheave and other parts necessary for an elevator.

In FIG. 4, a wireless communication channel 403 is used to transfer information from the load weighing device 401 and the curtain of light 402. The transferred information is received at a control device 404. The control device comprises a processor 405 for executing computer programs and a memory 406 for storing the computer programs and related data, such as data received over the wireless communication channel 403. Although in FIG. 4 a wireless communication channel is used, it is possible that the controller device 404 is located at the elevator car and connected in a wired manner to the curtain of light 402 and the load weighing device 401.

The control device 404 is configured to perform a method similar to the one disclosed in FIG. 1. The result computed using the method may be then transmitted to other systems using another wireless communication channel or a fixed connection. The results computed can be used for various purposes.

The above-mentioned method may be implemented as computer software which is executed in a computing device. When the software is executed in a computing device, it is configured to perform the above-described inventive method. The software is embodied on a computer readable medium so that it can be provided to the computing device, such as the control device 404 of FIG. 4.

As stated above, the components of the exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, floppy disk, flexible disk, hard disk, magnetic tape, any other suitable magnetic medium, CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, RAM, PROM, EPROM, FLASH-EPROM, any other suitable memory chip or cartridge, carrier wave or any other suitable medium from which a computer can read.

It is obvious to a person skilled in the art that with the advancement of technology, the basic idea of the passenger counting arrangement may be implemented in various ways. The passenger counting arrangement and its embodiments are thus not limited to the examples described above; instead they may vary within the scope of the claims.

The invention claimed is:

1. A method for counting the number of passengers in an elevator car, the method comprising:
   detecting a first number of passengers using a load weighing device of the elevator;
   detecting a second number of passengers using a curtain of light;
   comparing said first number and said second number;
   as a response to an equal value of the first and the second number, approving said value as the number of passengers;
   as a response to unequal values, determining a compensation value for one of the first and second numbers by using information received from a corresponding measurement device;
   adding said compensation value to said one of the first and second number; and
   providing the result of said addition as a passenger count.

2. The method according to claim 1, wherein said compensation value is zero or one.

3. The method according to claim 2, wherein when said first number is smaller, said compensation value is determined by dividing the weight measured by the measurement device by the weight of an average person and determining the compensation for said first number based on said division result.

4. The method according to claim 2, wherein when said second number is smaller, said compensation value is determined by detecting legs from the measurement of said curtain of light and detecting if persons detected by the curtain of light comprise more than two legs, and adding passengers to the compensation value based on said detection.

5. The method according to claim 2, wherein as a response to unequal values, the method further comprises using the order of received measurement results for determining said compensation value.

6. The method according to claim 1, wherein said compensation does not exceed the difference between the first and the second number.

7. The method according to claim 6, wherein when said first number is smaller, said compensation value is determined by dividing the weight measured by the measurement device by the weight of an average person and determining the compensation for said first number based on said division result.

8. The method according to claim 6, wherein when said second number is smaller, said compensation value is determined by detecting legs from the measurement of said curtain of light and detecting if persons detected by the curtain of light comprise more than two legs, and adding passengers to the compensation value based on said detection.

9. The method according to claim 6, wherein as a response to unequal values, the method further comprises using the order of received measurement results for determining said compensation value.

10. The method according to claim 1, wherein when said first number is smaller, said compensation value is determined by dividing the weight measured by the measurement device by the weight of an average person and determining the compensation for said first number based on said division result.

11. The method according to claim 10, wherein as a response to unequal values, the method further comprises using the order of received measurement results for determining said compensation value.

12. The method according to claim 1, wherein when said second number is smaller, said compensation value is determined by detecting legs from the measurement of said curtain of light and detecting if persons detected by the curtain of light comprise more than two legs, and adding passengers to the compensation value based on said detection.

13. The method according to claim 12, wherein when the compensation value determined is less than the difference between the first number and the second number, the method further comprises determining a further compensation value by combining the measurements and determining if the combined weight of a detected pair of persons is smaller than an average weight of two persons.

14. The method according to claim 13, wherein as a response to unequal values, the method further comprises using the order of received measurement results for determining said compensation value.

15. The method according to claim 12, wherein as a response to unequal values, the method further comprises using the order of received measurement results for determining said compensation value.

16. The method according to claim 1, wherein as a response to unequal values, the method further comprises using the order of received measurement results for determining said compensation value.

17. The method according to claim 16, wherein in addition to using said order, using a time interval between said measurement results for determining said compensating value.

18. A computer program embodied on a non-transitory computer readable medium, wherein said computer program is configured to perform the steps of claim 1 when executed in a computing device.

19. An apparatus comprising:
- at least one processor configured to execute computer programs;
- at least one memory configured to store computer programs and related data;
- a data communication connection configured to receive data from a curtain of light and a load weighing device of an elevator car,
- wherein the apparatus is further configured to perform the method according to claim 1.

20. An elevator comprising the apparatus according to claim 19.

* * * * *